United States Patent
Sugiyama

(10) Patent No.: US 6,965,958 B1
(45) Date of Patent: Nov. 15, 2005

(54) SEARCHING FOR PRINTERS OVER A NETWORK USING INTERMEDIATE PRINT DATA

(75) Inventor: Hideki Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 09/692,229

(22) Filed: Oct. 20, 2000

(30) Foreign Application Priority Data

Oct. 28, 1999 (JP) .......................................... 11-307097

(51) Int. Cl.⁷ .............................................. G06F 1/00
(52) U.S. Cl. ..................... 710/104; 710/305; 710/105; 710/12; 358/404; 358/444; 358/1.1; 358/1.15; 400/76; 400/70
(58) Field of Search ............................... 710/104–106, 710/110, 62, 15–19, 305, 12; 358/1.1, 1.15, 1.16, 1.12, 1.18, 404, 406, 405, 444, 437, 407; 400/70, 76

(56) References Cited

U.S. PATENT DOCUMENTS

| | | | | |
|---|---|---|---|---|
| 5,978,557 A | * | 11/1999 | Kato | 358/1.15 |
| 6,154,218 A | * | 11/2000 | Murase et al. | 345/619 |
| 6,256,750 B1 | * | 7/2001 | Takeda | 714/11 |
| 6,320,667 B1 | * | 11/2001 | Mitsuhashi | 358/1.1 |
| 6,334,721 B1 | * | 1/2002 | Horigane | 400/76 |
| 6,356,355 B1 | * | 3/2002 | Cohen et al. | 358/1.15 |
| 6,452,692 B1 | * | 9/2002 | Yacoub | 358/1.15 |
| 6,474,881 B1 | * | 11/2002 | Wanda | 400/61 |
| 6,493,099 B2 | | 12/2002 | Nakagiri | 358/1.13 |
| 6,552,813 B2 | * | 4/2003 | Yacoub | 358/1.1 |
| 6,601,087 B1 | * | 7/2003 | Zhu et al. | 709/205 |

FOREIGN PATENT DOCUMENTS

| | | |
|---|---|---|
| JP | 09-190313 | 7/1997 |
| JP | 10-333844 | 12/1998 |
| JP | 11-129583 | 5/1999 |

OTHER PUBLICATIONS

Teeuwen et al. (US2001/0038462) Interactive printing with a plurality of printer devices.*

* cited by examiner

Primary Examiner—Paul R. Myers
Assistant Examiner—Raymond N Phan
(74) Attorney, Agent, or Firm—Fitzpatrick, Cella, Harper & Scinto

(57) ABSTRACT

A printer serving as an output destination can be automatically set from print data. Further, in order to search an optimum printer during a series of operations within a range from the issue of a print command to the printing and improve a working efficiency of the user, whether the data whose printing has been instructed by an application is a spool designated print job or not is discriminated (S1). When it is spool designated, a spooler interprets a DDI function, generates intermediate data, and spools as intermediate data into a spool file (S3). Whether all drawing functions outputted from the application have been spooled in the spool file or not is discriminated (S4). If YES, a print destination changing process is executed (S5). A print destination is changed and a network printer held in an RAM is updated. After that, the processing routine is returned to step S1 and the above processes are repeated.

20 Claims, 12 Drawing Sheets

FIG. 3

| DEVICE NAME | NETWORK ADDRESS | OBJECT CLASS | DEVICE TYPE | COLOR PRINTING | DUPLEX PRINTING | STAPLING |
|---|---|---|---|---|---|---|
| COLOR PRINTER | 192.168.16.131 | PRINTER | PRINTER | 1 | 0 | 1 |
| MFP | 192.168.16.132 | PRINTER | MFP | 0 | 1 | 1 |
| 2ND MONOCHROME PRINTER | 192.168.16.155 | PRINTER | PRINTER | 0 | 0 | 1 |
| 1ST MONOCHROME PRINTER | 192.168.16.156 | PRINTER | PRINTER | 0 | 1 | 0 |
| SCANNER | 192.168.16.32 | SCANNER | SCANNER | NA | NA | NA |
| — | — | — | — | — | — | — |

FIG. 4

ESC|COLOR|ESC|DUPLEX|ESC|STAPLE 3]···

FIG. 7

| PRINTER | | | | |
|---|---|---|---|---|
| FILE | EDIT | VIEW | | HELP |

| NAME | DOCUMENT | STATUS | COMMENT |
|---|---|---|---|
| AVAILABLE DEVICE(S) | | | |
| PCL PRINTER | 0 | | ROOM 1 WEST |
| COMPOSITE-1 | 0 | | ROOM 2 CENTER |
| COLOR PRINTER | 0 | | ROOM 1 EAST |
| ROUTINE PRINTER | 0 | | ROOM 1 EAST |
| MANAGER PRINTER | 0 | | ROOM 2 NORTH |

— 49

| FILE NAME | PAGES | PAGE LAYOUT | COMMENT |
|---|---|---|---|
| MATERIAL-1 | 3 | 2 PAGES/SHEET | PATENT MATERIAL |

600DPI/2-UP
DUPLEX/MONOCHROME

— 48a

— 48

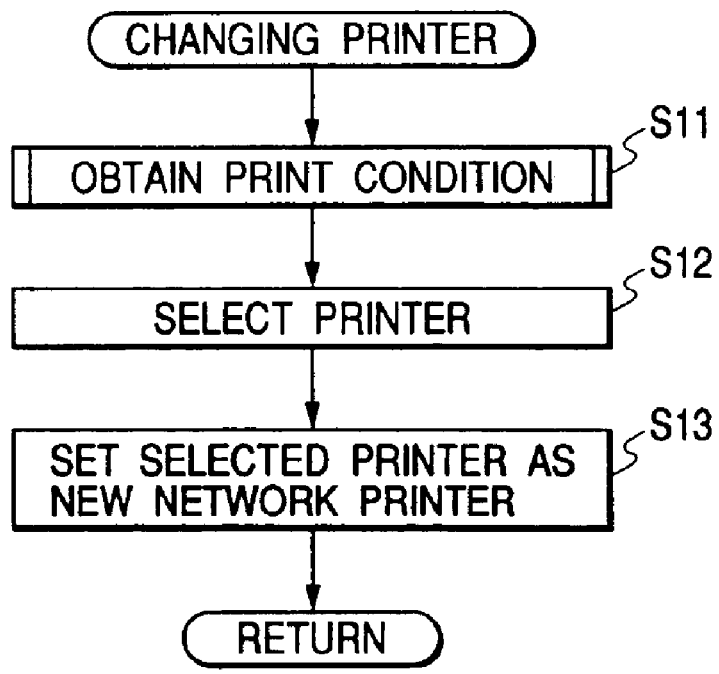

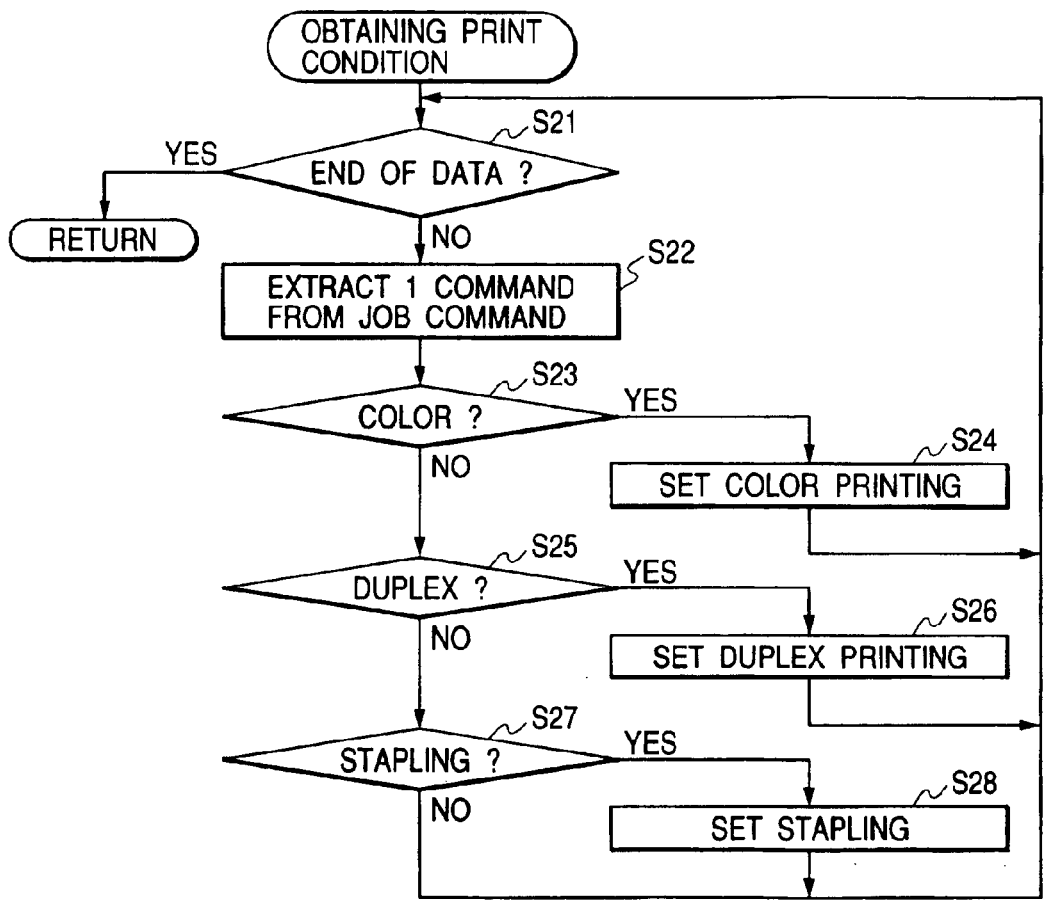

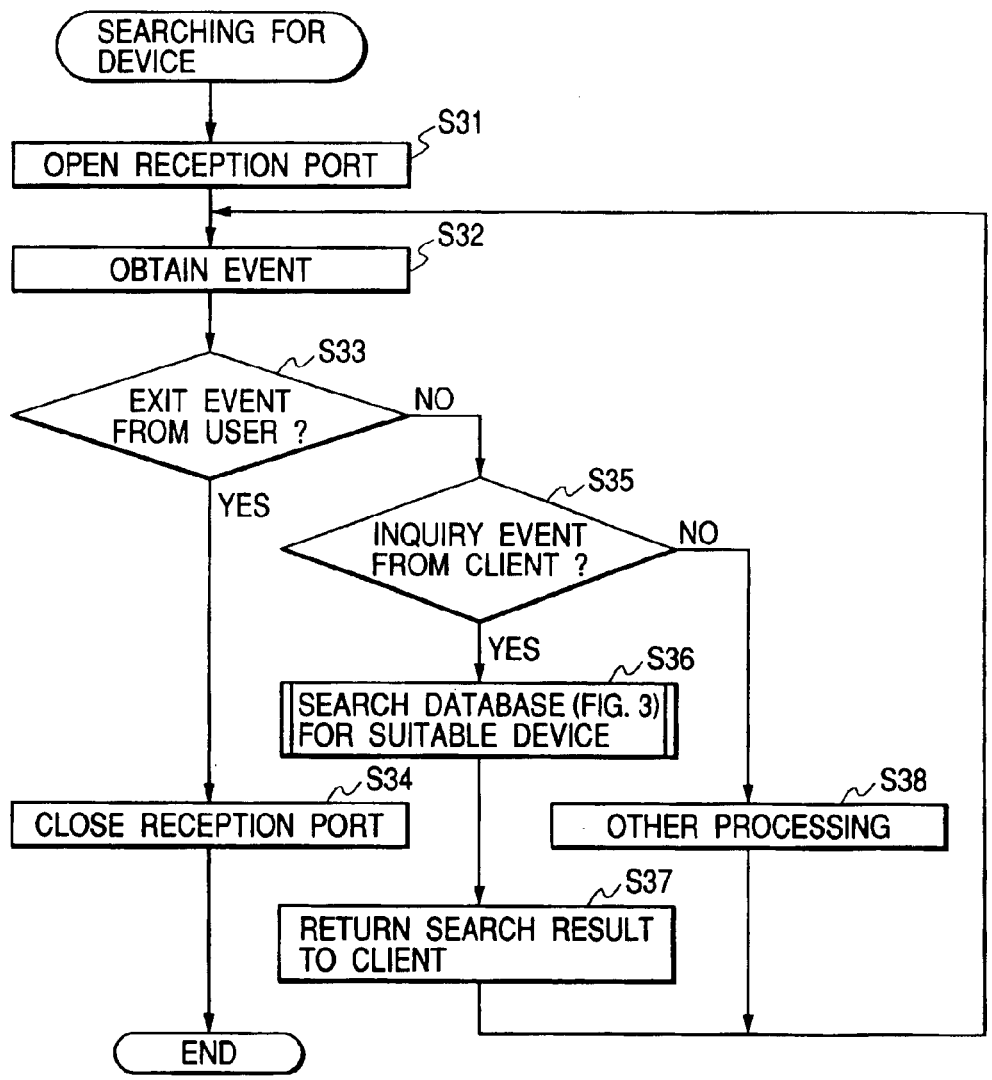

FIG. 14

| DEVICE NAME | NETWORK ADDRESS | DEVICE TYPE | COLOR PRINTING | DUPLEX PRINTING | STAPLING |
|---|---|---|---|---|---|
| COLOR PRINTER | 192.168.16.31 | PRINTER | 1 | 1 | 1 |
| MFP | 192.168.16.32 | MFP | 0 | 1 | 1 |
| 2ND MONOCHROME PRINTER | 192.168.16.155 | PRINTER | 0 | 0 | 1 |
| 1ST MONOCHROME PRINTER | 192.168.16.156 | PRINTER | 0 | 1 | 0 |

SEARCHING FOR PRINTERS OVER A NETWORK USING INTERMEDIATE PRINT DATA

BACKGROUND OF THE INVENTION

1. Field of the Invention

The invention relates to an information processing apparatus, an information processing method, an information processing system, and a recording medium. More particularly, the invention relates to an information processing apparatus for searching a printing apparatus (hereinafter, simply referred to as a printer) which can print under desired print conditions from a plurality of printers connected to a network and transmitting print data to the searched printer, an information processing method for such an apparatus, an information processing system to which a plurality of devices including the information processing apparatus and printers are connected through the network, and a computer readable recording medium which records a print processing procedure for searching a printer having predetermined print conditions and selecting a printer on the print destination side.

2. Related Background Art

A service called a directory service has been provided as a method of efficiently finding out various resources (printer, server, scanner, etc.) (hereinafter, those resources are generally called "network devices") connected to a network such as an LAN (Local Area Network) or the like and using them.

The directory service is a service having a function as a telephone book (directory) regarding the network. As is standard, for example, an LDAP (Lightweight Directory Access Protocol) has been known. The regulations of the LDAP have been disclosed in the RFC (Request For Comments) 1777 issued from the IETF (Internet Engineering Task Force) as research and development facilities of the Internet. As a description of the LDAP, for example, "LDAP Internet Directory Application Programming" (issued on Nov. 1, 1997) issued by Plentis Hall Co., Ltd. has been known.

For example, a network device such as a printer or the like connected to the network can be searched by using the directory service, so that the user can obtain a list of network addresses of the devices which can be used on the network.

In case of searching the printer as a network device, however, since there are a variety of search conditions of the printer such as paper size, permission/inhibition of a duplex printing, permission/inhibition of a color printing, and the like, there is a problem such that it is troublesome when the user sets the search conditions.

After a print command was issued to a specific printer, when a command indicative of an attribute mismatch is returned from the specific printer, a print attribute is designated after such a command was received, thereby searching the printer adapted to the desired print attribute. Therefore, there is a problem such that it takes a long time until the completion of a printing process after the issue of the print command, work contents are also complicated, and a working efficiency is deteriorated.

SUMMARY OF THE INVENTION

The invention is made in consideration of the problems and it is an object of the invention to provide an information processing apparatus, an information processing method, an information processing system, and a recording medium, in which a printer on the output destination side can be automatically set from print data, further, an optimum printer can be searched during a series of operation in a range from an issue of a print command to a completion of a printing, and a working efficiency of the user can be improved.

To accomplish the above object, according to the invention, there is provided an information processing apparatus which is connected to a plurality of printers through a network, designates a specific printer from the plurality of printers, and transmits print data to the designated printer, comprising: storing means in which application software to generate the print data and driving software to drive the printer have been stored; drawing function forming means for forming a drawing function on the basis of the application software; intermediate data generating and print condition obtaining means for generating intermediate data on the basis of the drawing function and obtaining print conditions for printing a print job of the intermediate data; holding means for holding the intermediate data and the print conditions; display means for displaying at least one or more searched printers on the basis of the print conditions; printer designating means for designating a specific printer serving as an output destination from the printers displayed on the display means; and print control means for controlling in such a manner that the intermediate data held in the holding means is sent to the driving software corresponding to the specific printer designated by the printer designating means and the print data is generated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a directory table showing attributes of network devices;

FIG. 4 is a diagram showing an example of a job command;

FIG. 7 is a display screen showing an example of a search device display window and a spool job window;

FIG. 9 is a flowchart for a print destination change processing routine;

FIG. 10 is a flowchart for a print condition setting processing routine;

FIG. 11 is a diagram showing an example of search conditions and inquiry conditions which are temporarily held in the client;

FIG. 12 is a flowchart showing a processing procedure for a device searching process;

FIG. 14 is a diagram showing an example of search results; and

DETAILED DESCRIPTION OF THE PREFERRED EMBODIMENTS

An embodiment of the invention will now be described with reference to the drawings.

Figure 1:
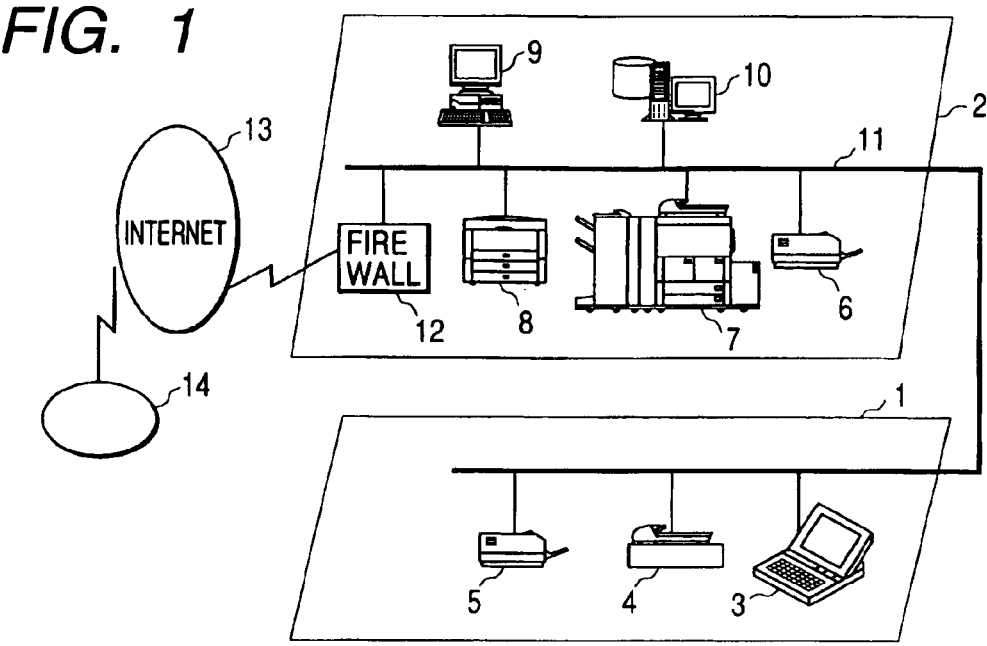
FIG. 1 is a system constructional diagram showing an embodiment of a device searching system as an information processing system according to the invention.

FIG. 1 is a system constructional diagram showing an embodiment of a device searching system as an information processing system according to the invention. According to the device searching system, a plurality of network devices are provided in each of a first room 1 and a second room 2.

Specifically speaking, a first client machine (hereinafter, referred to as a "first client") 3 comprising a notebook-sized personal computer (hereinafter simply referred to as a "note PC"), a scanner 4 for performing a reading process of image data including text data, and a first monochrome printer 5 for print processing the image data in monochromatic color are provided in the first room 1. A second monochrome printer 6 for print processing the image data in monochromatic color, an MFP (Multi Function Peripheral) 7 as a copying apparatus which can be also used as a network printer, a color printer 8 for color-printing the image data, a second client machine (hereinafter, referred to as a "second client") 9 comprising a desktop type personal computer (hereinafter simply referred to as a "desktop PC"), and a search server machine (hereinafter, referred to as a "search server") 10 for performing a searching process of the network device on the basis of commands from the first and/or second clients 3 and/or 9 are provided in the second room 2. That is, the scanner 4, a plurality of printers 5 to 8, and a plurality of personal computers (PCs) 3, 9, and 10 are provided as network devices in the first and second rooms 1 and 2. The network devices 3 to 10 are mutually connected through a LAN 11, connected to an Internet 13 through a fire wall 12, and further connected to another dedicated network 14 through the Internet 13.

Figure 2:
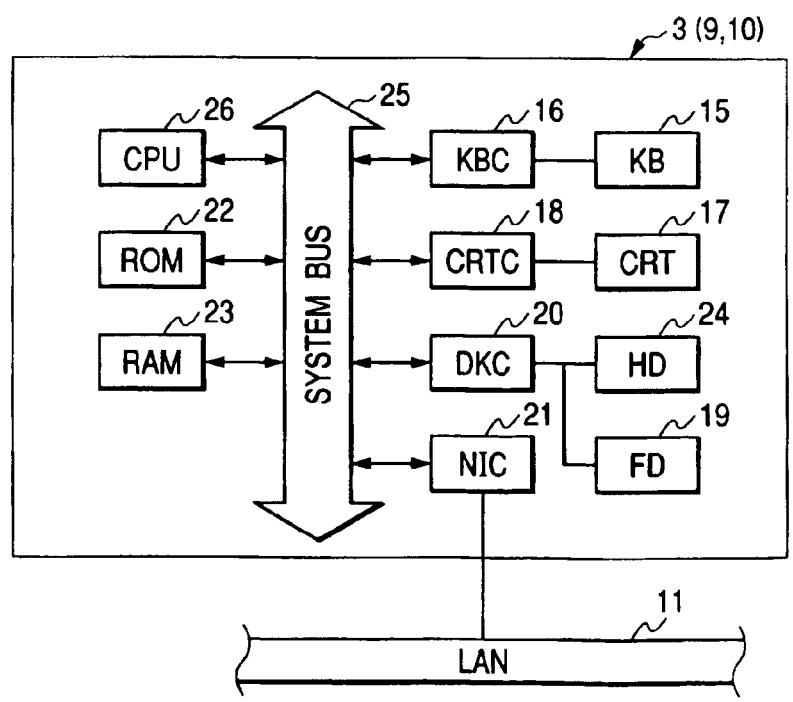
FIG. 2 is a block constructional diagram showing the inside of each personal computer (first and second clients and search server)

FIG. 2 is a block constructional diagram showing the inside of each of the personal computers, namely, the first and second clients 3 and 9 and the search server 10. Each personal computer comprises: a keyboard (KB) 15 for performing the inputting operation of various data; a keyboard controller (KBC) 16 for controlling input information from the keyboard (KB) 15, a pointing device or the like (not shown); a CRT display (CRT) 17 for displaying the image data; a CRT controller (CRTC) 18 for controlling display contents of the CRT 17; a hard disk (HD) 24 and a flexible disk (FD) 19 each for storing a boot program, various applications, an edit file, a user file, a network management program, and the like; a disk controller (DKC) 20 for controlling accesses to the HD 24 and FD 19; a network interface card (NIC) 21 for bidirectionally exchanging data to other network devices (printers, other PCs, etc.) connected through the LAN 11; an ROM 22 in which the network management program has previously been stored in a manner similar to the HD 24; an RAM 23 which is used for temporarily storing an arithmetic operation result and is used as a work area; and a CPU 26 which is connected to those component elements through a system bus 25 and controls the whole apparatus.

As mentioned above, a hardware construction of each of the first and second clients 3 and 9 and the search server 10 has the construction shown in FIG. 2. The print processing program has been stored in the HD 24 and ROM 22 of the first and second clients 3 and 9. The search processing program has been stored in the HD 24 and ROM 22 of the search server 10. Each of the first and second clients 3 and 9 executes the print processing program, transmits predetermined inquiry information (search conditions) to the search server 10, and allows a search result which is transmitted from the search server 10 to be displayed on the CRT 17. The search server 10 executes the search processing program in response to the inquiry information from the first and second clients 3 and 9 and returns a search result to the first and second clients 3 and 9.

FIG. 3 is a directory table showing attributes of the network devices. The directory table has been stored as registration information of the directory in the HD 24 of the search server 10.

Specifically speaking, the directory table comprises: a device name 27, a network address 28, an object class 29, a device type 30, a color printing (permission/inhibition of the color printing) 31, a duplex printing (permission/inhibition of the duplex printing) 32, and a stapling (permission/inhibition of the stapling) 33.

Each name of the network printers (color printer 8, MFP 7, first and second monochrome printers 5 and 6) and the scanner 4 connected to the LAN 11 is written in the device name 27. Addresses on the LAN 11 which are peculiar to those network devices are written in the network address 28.

A function type of the device is registered in the object class 29. For example, in the case where a specific device has a printing function, the printers 5, 6, and 8 serving as single devices and the MFP 7 are also written as "printers".

The whole function of the device is written in the device type 30. Therefore, even when the function of the device indicates the printer, whether this printer is one of the printers 5, 6, and 8 as single devices or the MFP 7 as a composite device can be distinguished.

When the network device supports the print attribute, "1" is written in the color printing 31, duplex printing 32, and stapling 33. When the network device does not support the print attribute, "0" is written. When the information regarding the print attribute does not exist, "NA" is written.

In FIG. 3, for example, when the name of the network device is "color printer", it means that the network address is "192.168.16.131", the device has the printing function, the whole function corresponds to the single printer, and the duplex printing is not supported although the color printing and the stapling are supported as print attributes.

An installing location, a URL (homepage address), an IP address, and the like can be also properly added as attribute information of the network device.

FIG. 4 is a diagram showing an example of a job command. In the embodiment, one command (command of the minimum unit) is constructed by a command which starts with "ESC[" and ends with "]". That is, for example, one command is constructed by ESC[COLOR]. In FIG. 4, it is shown that each command of COLOR (color printing), DUPLEX (duplex printing), and STAPLE (stapling) is instructed. Command information can be also added after the "STAPLE" command as necessary (for example, "3" is added in the embodiment). Thus, for example, a print condition showing that the stapling direction is set to the portrait side can be added.

Figure 5:
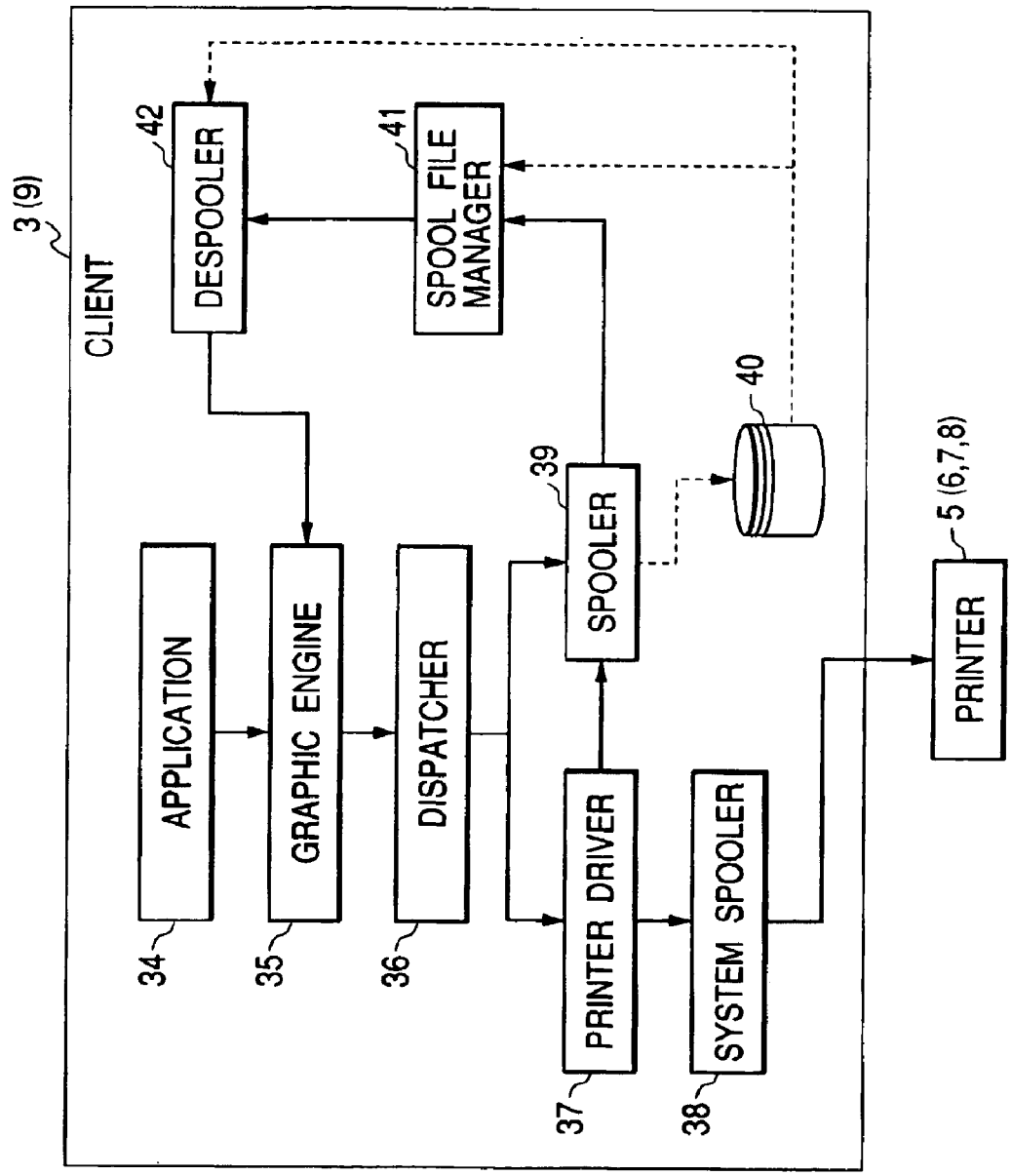
FIG. 5 is a module constructional diagram showing a program module of the first and second clients.

FIG. 5 is a module constructional diagram showing the program module of the first and second clients 3 and 9.

Application software (hereinafter, simply referred to as an "application") 34 is loaded into the RAM 23 from the HD 24, is executed by the CPU 26, and forms a text file or the like to be printed.

A graphic engine 35 is drawing means of an operation system (OS), is called GDI (Graphic Device Interface) in Windows (Microsoft Corporation of U.S.A.), and converts the drawing function as an output from the application 34 into a DDI function (Device Driver Interface) as a print command.

A dispatcher 36 transfers predetermined data to a printer driver 37 or a spooler 39 in accordance with output contents from the graphic engine 35.

The printer driver 37 is loaded into the RAM 23 from the HD 24 and executed by the CPU 26. The system spooler 38 manages the print data to be transferred to the printers 5 to 8.

The application 34 and printer driver 37 have previously been stored in the FD 19 or a CD-ROM (not shown) or in the HD 24 through the network.

The spooler 39 interprets the print command of the DDI function transferred from the graphic engine 35 through the dispatcher 36, converts it into an intermediate code which can be modified, obtains modification settings (output paper size, page layout, the number of copies, stamp designation, stapling designation, duplex designation, binding printing designation, resolution, etc.) regarding the printing process which has previously been set by the user through the user interface of the printer driver 37, and further, notifies a spool file manager 41 of a forming situation of a spool file 40.

The spool file 40 holds the intermediate data generated by the spooler 39 and the foregoing modification setting data.

The spool file manager 41 discriminates whether all of the intermediate data held in the spool file 40 has been spooled or not. If the answer is YES, the manager 41 discriminates which search conditions a print job of the spooled intermediate data has and extracts them. The spool file manager 41 further allows the search server 10 to search the device which can output on the basis of the extracted search conditions, thereby obtaining the device information which can be outputted from the search server 10 and allowing the result to be displayed on the CRT 17.

A despooler 42 modifies the intermediate data in accordance with the modification setting data, generates the modified intermediate data as a drawing function, and outputs the drawing function again to the graphic engine 35 as if the despooler itself is an application. The despooler 42 designates the device designated by the user in FIG. 7, which will be explained hereinlater, as an output destination device of the drawing function.

Figure 6:
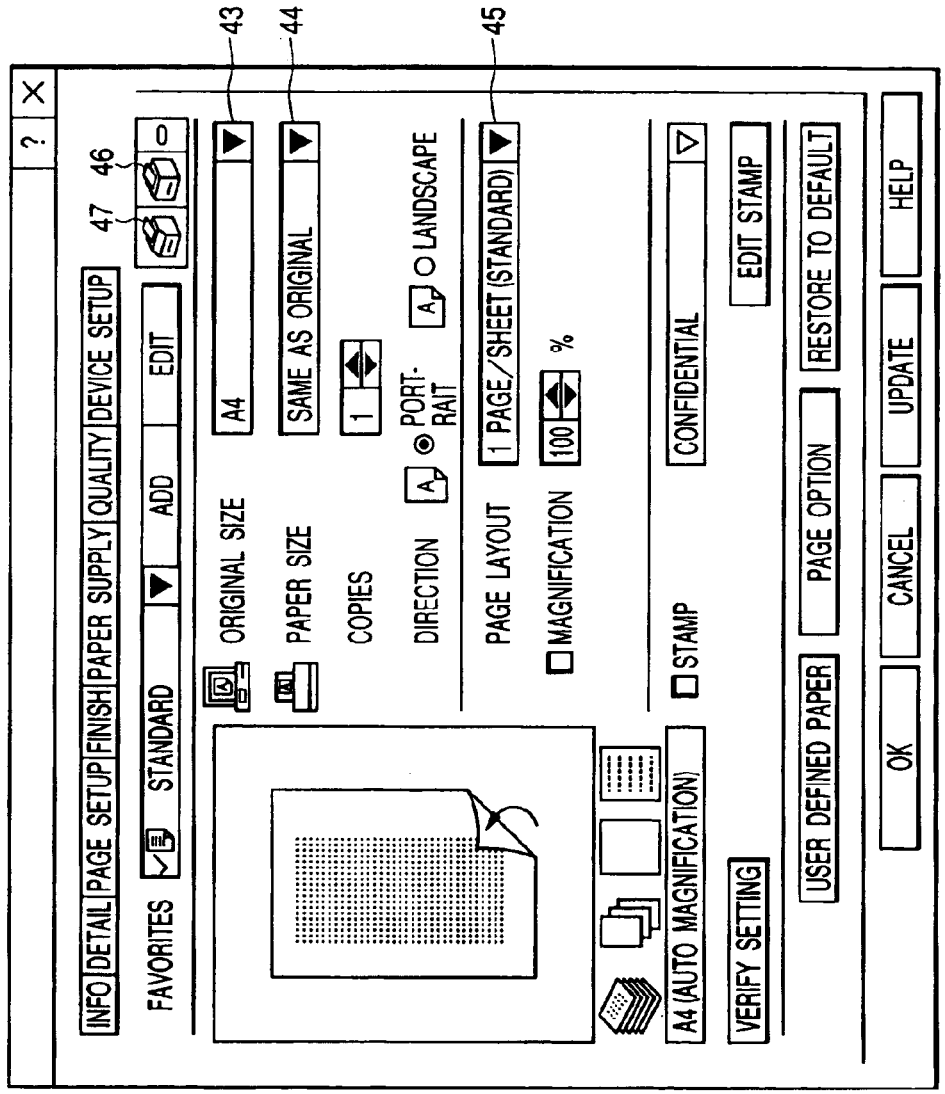
FIG. 6 is a display screen showing an example of a user interface of a printer driver.

FIG. 6 is a display screen showing an example of the user interface of the printer driver 37 which is displayed on the CRT 17. The display screen has an original size setting unit 43, an output paper size setting unit 44, a page layout setting unit 45, and the like. The user can set desired modification data (print conditions).

A spool button 46 is pressed in the case where the text data formed by the application 34 is spooled once as intermediate data into the spool file 40 without immediately printing by the printer.

Further, a quick print button 47 is pressed in the case where the print data is printed by the printer at an output destination port which is designated by the printer driver without spooling the text data formed by the application 34.

In the first or second client 3 or 9, when the quick print button 47 is pressed, the application 34 held in the HD 24 is loaded into the RAM 23 and executed, so that the text data or the like to be printed is formed. Further, the printer driver 37 prepared for each of the printers 5 to 8 is loaded into the RAM 23 from the HD 24. In the graphic engine 35, the drawing function as an output from the application 34 is converted into the DDI function and outputted to the printer driver 37 through the dispatcher 36. Subsequently, in the printer driver 37, the DDI function is interpreted and converted to the printer control command and outputted to the printers 5 to 8 through the system spooler 38 loaded in the RAM 23.

When the spool button 46 is pressed, first, the application 34 held in the HD 24 is loaded into the RAM 23 and executed and the text data or the like to be printed is formed. In the graphic engine 35, the drawing function from the application 34 is converted into the DDI function. The dispatcher 36 receives the DDI function (print command). If the print command received by the dispatcher 36 is a print command issued from the application 34 to the graphic engine 35, the dispatcher 36 loads the spooler 39 stored in the HD 24 into the RAM 23 and transfers the print command to the spooler 39.

Subsequently, the spooler 39 interprets the received print command of the DDI function, converts into an intermediate code which can be modified, further obtains the modification setting regarding the printing process which has previously been set by the user by the printer driver 37, and holds into the spool file 40.

The spooler 39 subsequently loads the spool file manager 41 stored in the HD 24 into the RAM 23 and notifies the spool file manager 41 of a forming situation of the spool file 40.

After that, the spool file manager 41 discriminates whether all of the intermediate data held in the spool file 40 has been spooled or not. If YES, what kinds of search conditions the print job of the spooled intermediate data has are discriminated and the search conditions are extracted. The spool file manager 41 allows the search server 10 to search the device which can output on the basis of the extracted search conditions. The search result is displayed as a user interface onto the CRT 17 through the despooler 42.

FIG. 7 is a display screen showing the search result obtained from the search server 10. A spool job window 48 displays a print job shown by the intermediate data held in the spool file 40. A file name, the number of pages of the job, a page layout designated by the print setting, a comment designated by a profile of the text file, and the like are displayed. In the case where a cursor displayed by a pointing device such as a mouse or the like points out the spool job, the print setting of the spool job is caption displayed as shown at 48a.

Reference numeral 49 denotes a search device display window. Devices notified as devices which can be used as a result of the search of the search server 10 on the basis of the search conditions of the spool job displayed in the spool job window 48 are displayed in the window 49. Specifically speaking, a name of device, the number of process waiting jobs of the device, a state of the device, a comment showing a physical position where the device exists, and the like are displayed.

As mentioned above, a list of the devices which can execute the print job is displayed on the CRT 17 by the search server 10. The user drags the print job by the pointing device such as a mouse or the like and drops to an icon of one of the devices which can be used, thereby enabling the device as a target of the icon to which the pointing device was dropped to execute the printing.

That is, when the dispatcher 36 receives the print command issued from the despooler 42 to the graphic engine 35, the print command is sent to the printer driver 37 designated by the user interface (FIG. 6). The printer driver 37 forms print data comprising a printer control command depending on the device and outputs the print data to the printers 5 to 8 via the system spooler 38.

As mentioned above, hitherto, all of the text data and the like formed by the application 34 are sent to the printer driver 37 (the same as the case where the quick print button 47 is pressed in the embodiment). Therefore, a point when the application 34 is released from the printing process is always the point when the printer driver 37 has converted all of the print commands (DDI functions) from the graphic engine 35 into control commands of the printer. In the embodiment, however, since the application 34 is released from the printing process at a point when the spooler 39 converts all of the print commands into the intermediate codes by the user's depression of the spool button 46 and outputs them to the spool file 40, a time necessary for the printing process of the application 34 can be reduced.

Since the contents in the spool file 40 can be modified, a function which the application 34 does not have, namely, a function such as enlargement/reduction, Nin1 printing in which a plurality of pages are reduced and printed on one page, or the like for the print data from the application can be realized.

Figure 8:
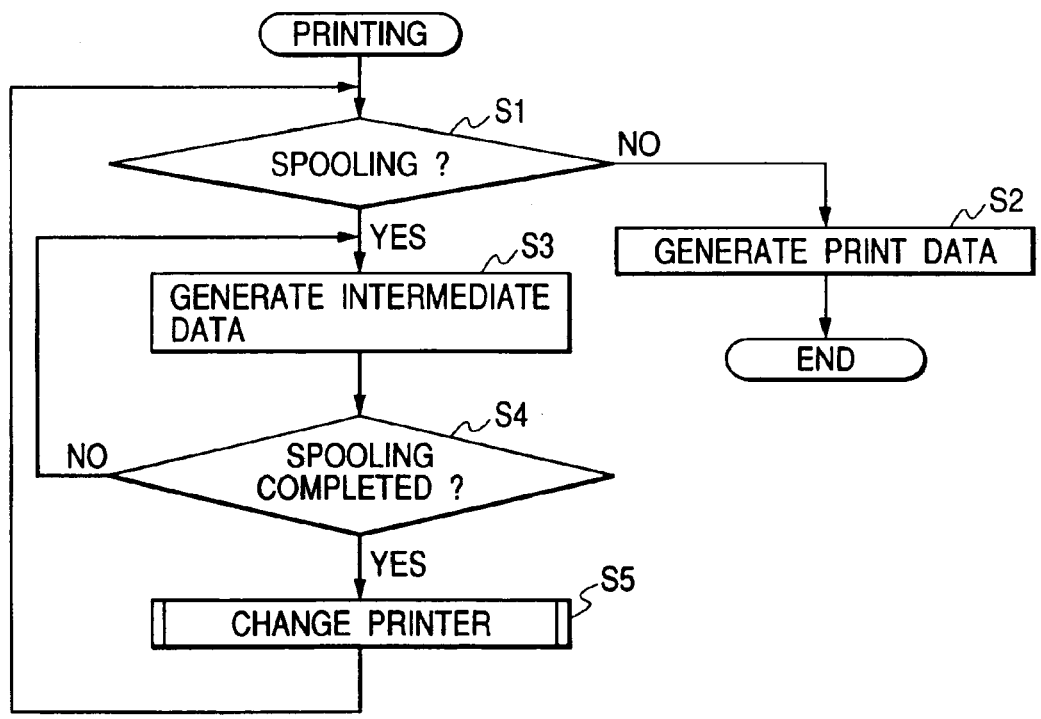
FIG. 8 is a flowchart showing a processing procedure for a printing process.

FIG. 8 is a flowchart showing a processing procedure for a device search printing process which is executed by the CPU 26 of the clients 3 and 9. First, in step S1, whether the data whose printing has been instructed by the application 34 is a print job which was spool designated or a print job of a routine printing is discriminated. That is, whether the spool button 46 has been pressed, the quick print button 47 has been pressed, or the spool designation has been made in the user interface in FIG. 6 is discriminated. When the quick print button 47 has been pressed, namely, when the spool designation is not made, there is no need to perform the searching process or the like of the device. Therefore, step S2 follows. The print data comprising the print control command depending on the device is generated by the printer driver 37 designated at present. A predetermined protocol is executed between the apparatus and the network printer to which the print data should be outputted, a communication path is established, and the print data is transmitted.

When the spool button 46 has been pressed, namely, when the spool designation has been made, step S3 follows. The dispatcher 36 sends all of the DDI functions received from the graphic engine 35 to the spooler 39. The spooler 39 interprets the DDI functions and generates the intermediate data as mentioned above and spools them as intermediate data into the spool file 40.

Subsequently, in step S4, whether all of the drawing functions outputted from the application 34 have been spooled in the spool file 40 or not is discriminated. The generation of the intermediate data and the spooling process are repeated until the spool of all of the drawing functions is finished. In this instance, the spooler 39 reads the print setting which has been set in the printer driver 37 whose spool button 46 was pressed and stores it together with the intermediate data into the spool file 40.

When it is determined that all of the drawing functions and print setting have been stored in the spool file 40, step S5 follows. A print destination changing process is executed, the print destination is changed, and the network printer held in the RAM 23 is updated. After that, the processing routine is returned to step S1 and the above processes are repeated.

FIG. 9 is a flowchart for a print destination change processing routine which is executed in step S5. First, in step S11, a print condition obtaining process is executed, thereby obtaining the print conditions from the intermediate data held in the spool file 40 and print setting. The print conditions further comprises conditions which differ in dependence on the device and are selected from the print setting mentioned above. For example, the "duplex printing" designation, "stapling" designation, or the like is a condition which is selected from the print setting. "Color/monochrome" or the like is a condition which is obtained by analyzing the intermediate data. In step S12, the printer serving as a print destination is selected. That is, inquiry information as a search condition is transmitted to the search server 10, the search result corresponding to the inquiry information is received from the search server 10, and the search result which is matched with the print condition is displayed on the CRT 17 by the user interface as shown in FIG. 7. As mentioned above, the user designates a specific device from a plurality of devices searched by the search server 10 by an instruction by the drag & drop operation or the like and selects as a network printer on the print destination side. In step S13, the network device obtained in step S12 is held as a new network printer into the RAM 23. The processing routine is returned to the main routine (FIG. 8).

FIG. 10 is a flowchart for the print condition obtaining processing routine which is executed in step S11. First, in step S21, whether the print data held in the RAM 23 or HD 24 of the client has completely been searched with respect to up to the last data or not is discriminated. If YES, the processing routine is returned to the print destination change processing routine (FIG. 9). If NO, step S22 follows and the job command of the minimum unit is extracted on a minimum unit basis. That is, since the job command starts with "ESC[" and ends with "]" (refer to FIG. 4) as mentioned above, one command starting with "ESC[" and ending with "]" is extracted as a minimum unit.

In step S23, whether the job command extracted by the present loop in step S22 is the "COLOR" command or not is discriminated. If YES, step S24 follows. The "color printing" is set as a print condition and this print condition is held in the RAM 23. The processing routine is returned to step S21.

If it is determined in step S21 that the search of the print data is not finished yet, the next job command is extracted (step S22). If NO in step S23, namely, if it is determined that the job command extracted by the present loop is not the "COLOR" command, step S25 follows. Whether the job command is the "DUPLEX" command or not is discriminated. If YES, step S26 follows. The "duplex printing" is set as a print condition and this print condition is held in the RAM 23. The processing routine is returned to step S21.

If it is determined in step S21 that the search of the print data is not finished yet, the next job command is extracted again (step S22). If NO in steps S23 and S25, namely, if it is determined that the job command extracted at present is none of the "COLOR" command and the "DUPLEX" command, step S27 follows. Whether the job command is the "STAPLING" command or not is discriminated in step S27. If YES, step S28 follows. The "stapling" is set as a print condition and this print condition is held in the RAM 23. The processing routine is returned to step S21.

If it is determined in step S21 that the search of the print data is not finished yet, the next job command is extracted again (step S22). If NO in steps S23, S25, and S27, namely, if it is determined that the job command extracted at present is none of the "COLOR" command, the "DUPLEX" command, and the "STAPLING" command, it is decided that the job command is a command other than the print condition, for example, a draw command, font information, or the like. The processing routine is returned to step S21 and the above processes are repeated. After completion of the search of the print data, the present routine is finished and the processing routine is returned to the print destination changing routine (FIG. 9).

FIG. 11 is a diagram in which the print conditions 54 set by the print condition set processing routine and the inquiry information 55 to the search server 10 are described in accordance with RFC1960 which is issued by the IETF.

That is, in the embodiment, the conditions such that the object class indicates the printer and the print attributes of the color printing, duplex printing, and stapling are requested as print conditions 54. Only the condition such that the object class indicates the printer is designated as an inquiry information 55 to the search server 10. That is, according to the embodiment as will be explained hereinlater, since the client extracts the specific search condition, for example, only the condition regarding the object class from the search conditions and transmits it as inquiry information to the search server 10, only the condition such that the object class is the printer is shown in the embodiment.

The print conditions are updated by the CPU 26 each time the print conditions are changed in accordance with the flowchart of FIG. 10 and temporarily held in the RAM 23.

FIG. 12 is a flowchart for the device search processing routine which is executed by the CPU 26 of the search server 10. That is, when the search server 10 is activated, first, a reception port to accept a device searching request from the client is opened in step S31. By this operation, when the searching request from the client is received, the operating system issues a reception event and the reception of the searching request is notified to the program.

Subsequently, step S32 follows and the apparatus waits until some event is notified from the operating system. After the fact that some event was notified is detected, this event is obtained and step S33 follows. In step S33, whether the event obtained in step S32 is an exit event by the user or not is discriminated. If YES, the reception port is closed in step S34 and, thereafter, the present program is finished.

If NO in step S33, namely, if it is determined that the obtained event is not the exit event, step S35 follows. Whether the obtained event is an inquiry event from the client or not is discriminated. If YES in step S35, step S36 follows. A database, namely, the directory table (refer to FIG. 3) is searched and the device which is matched with the inquiry information from the client is selected. In step S37, a search result obtained in step S36 is returned to the client and the processing routine is returned to step S32.

If it is decided in step S35 that the obtained event is not the inquiry event, step S38 follows and a process other than the inquiry event, for example, the updating of the screen or the like is performed. The processing routine is returned to step S32.

Figure 13:
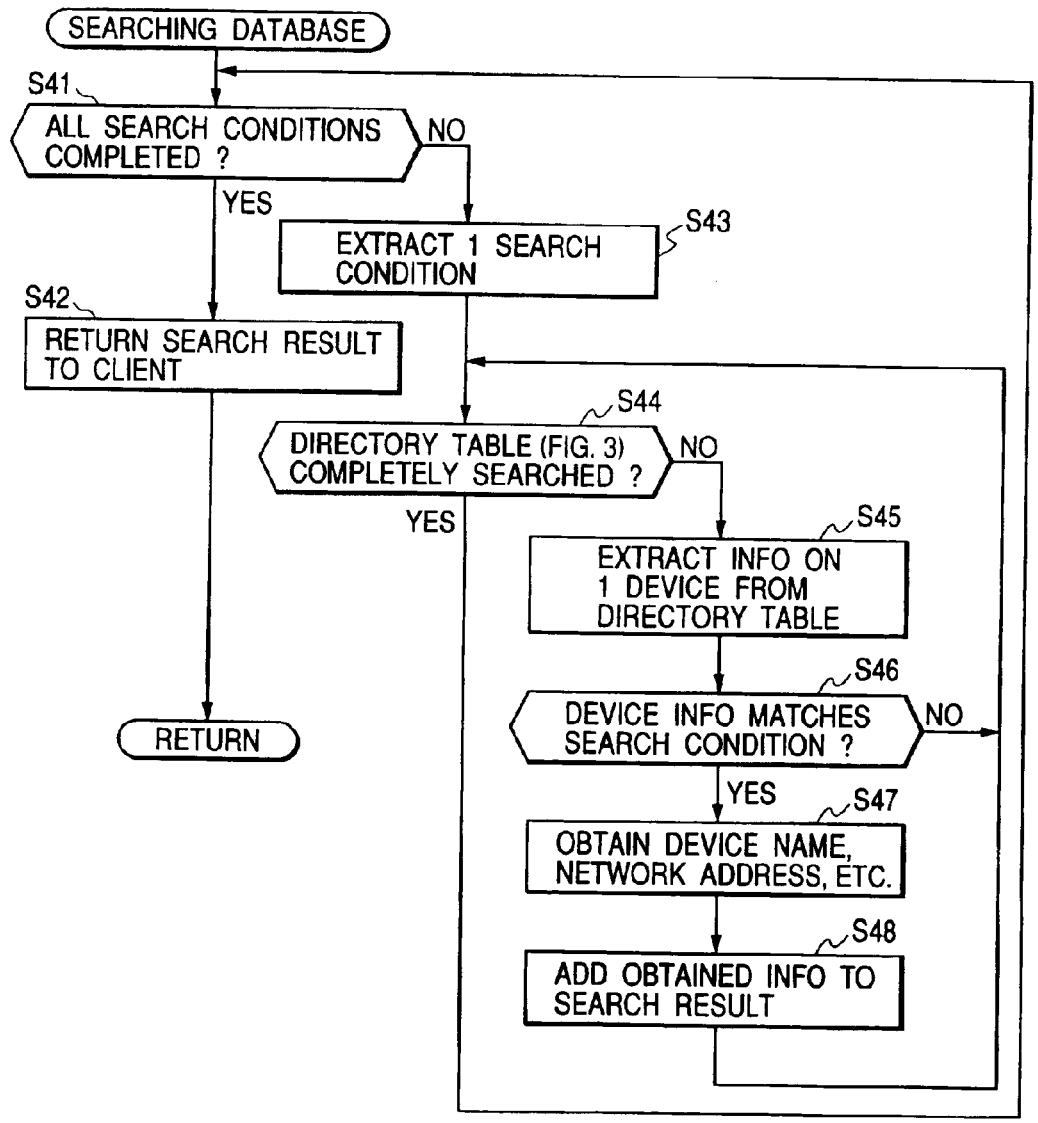
FIG. 13 is a flowchart for a database search processing routine.

FIG. 13 is a flowchart for the database search processing routine which is executed in step S36. In the embodiment, when the client designates a plurality of search conditions (inquiry conditions), those search conditions are processed one by one. That is, whether the processes for all of the search conditions have been finished or not is discriminated in step S41. If YES, step S42 follows and a search result is returned to the client. The processing routine is finished.

If NO in step S41, namely, when it is determined that the processes for all of the search conditions are not finished yet, step S43 follows. One of the search conditions (inquiry conditions) received from the client is extracted.

Subsequently, step S44 follows and whether the whole directory table (FIG. 3) has completely been searched or not is discriminated. If YES, the processing routine is returned to step S41. If NO, step S45 follows. In step S45, the device information of one device is extracted from the directory table in FIG. 3. In step S46, whether the device information extracted in step S45 is matched with the search condition (inquiry condition) or not is discriminated. If NO, the processing routine is returned to step S44. The process is continued with respect to the next device information registered in the database.

If YES in step S46, step S47 follows. The device name, network address, device type, and attribute information such as color printing, duplex printing, stapling, and the like in the device information which was determined to be matched with the search conditions in step S46 are extracted. In step S48, those various information is added to the search result. The processing routine is returned to step S44 and the above processes are repeated. That is, since the object class has been sent as an inquiry condition to the search server 10, the other attribute information is extracted from the directory table and those various information is returned to the client.

FIG. 14 shows a search result in the case where the client requested such a device search that the object class as an inquiry information indicates the printer. That is, in the embodiment, there are four devices matched with the inquiry information such that the object class indicates the printer, and various information such as device name, network address, device type, color printing, duplex printing, and stapling is shown with respect to each device.

In step S12 (FIG. 9) mentioned above, the client collates those search results with the print conditions 34 shown in FIG. 11, selects the printer having predetermined print attributes, and transmits the print data to the selected printer. That is, in the embodiment, the color printer 8 is selected as a printer on the print destination side from the print conditions 34 shown in FIG. 11. The print data is transmitted from the client to the color printer 8 and outputted from the color printer 8.

As mentioned above, according to the embodiment, even if the search conditions are not individually set, a desired printer can be automatically selected from the print data. Even if the printer whose print execution has been designated does not have an ability enough to obtain a desired print result, the operation such that the user designates the print attributes and searches the printer adapted to the print attributes as in the conventional manner is unnecessary. The printer serving as an output destination can be automatically selected and the data can be transmitted thereto, so that a labor and a troublesomeness of the printing work can be omitted.

The invention is not limited to the above embodiment. Although the predetermined process has separately been performed with respect to the search server 10 and clients 3 and 9 in the embodiment, the foregoing control program (print processing program and search processing program) can be also executed by the same personal computer. That is, not only the invention can be applied to the information processing system comprising a plurality of equipment (for example, host computer, interface equipment, reader, etc.)

but also one information processing apparatus has the functions of both of the client and the server, thereby also enabling a desired printer to be automatically selected.

In place of executing the print processing program (FIGS. 8 to 10) by the first or second client 3 or 9, it can be also executed by the MFP 7. That is, the print data from the client 3 or 9 is held in the MFP 7, the MFP 7 executes the print processing program and transfers the print data to another network printer, for example, color printer 8, and a desired printed matter can be obtained. For example, in the case where the printing is instructed to the MFP 7 from the second client 9 and the print data indicates a color original, the MFP 7 having the control program of the invention therein extracts the print attribute "COLOR" from the print data and searches a desired printer by using the print attribute "COLOR". Thus, the color printer 8 is searched and the user can obtain a desired print result by transferring the print data from the MFP 7 to the color printer 8.

According to the invention, it is also possible to install the control program from an external medium into the personal computer and execute the control program by this personal computer. In this case, the control program can be supplied to the personal computer by a recording medium such as CD-ROM, flash memory, flexible disk, or the like, or an information group including the program can be also downloaded from the external recording medium to the personal computer through a network such as E-mail, personal computer communication, or the like.

Figure 15:
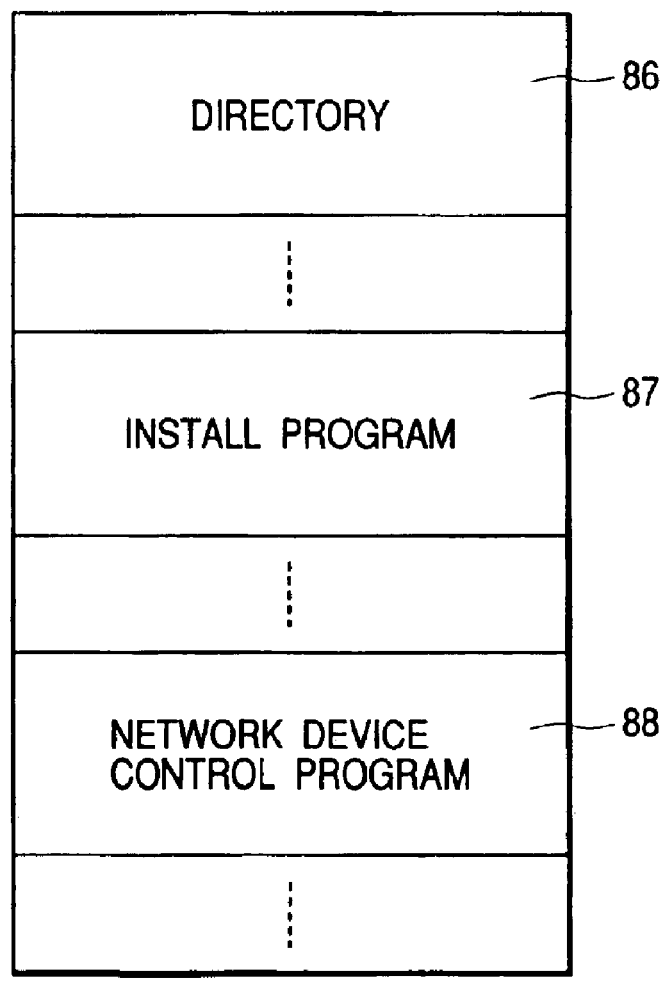
FIG. 15 is a diagram showing an example of a memory map in a CD-ROM as a recording medium.

FIG. 15 is a diagram showing an example of a memory map in a CD-ROM as a recording medium. Reference numeral 86 denotes a first storage area in which directory information, namely, storing position information of an install program and a network device control program is stored; 87 a second storage area in which the install program is stored; and 88 a third storage area in which the network device control program is stored.

In case of installing the network device control program into the personal computer, first, the install program stored in the second storage area 87 is loaded into the personal computer and executed by the CPU 26 of the personal computer. Subsequently, by executing the install program, the network device control program stored in the third storage area 88 is read out and stored in the HD 24.

It is also possible to construct the apparatus in such a manner that the recording medium on which program codes of the control program have been recorded is loaded into the client, server, or the like, and the CPU or MPU of the client, server, or the like reads out the program codes stored in the recording medium and executes them.

In this case, since the program codes themselves read out from the recording medium realize the functions of the invention, the recording medium in which the program codes have been recorded constructs the invention. As a recording medium for supplying the program codes, for example, an optical disk, a magnetooptic disk, a CD-ROM, a CD-R, a magnetic tape, a nonvolatile memory card, or the like can be used.

The functions of the invention mentioned above are realized by a method whereby the computer executes the read-out program codes. The objects of the invention can be also accomplished by a method whereby the operation system or the like which operates on the computer executes a part or all of the actual processes on the basis of instructions of the program codes.

Further, the program codes read out from the recording medium are written in a memory of a function expanding board inserted in a computer or a function expanding unit connected to a computer and, thereafter, a CPU or the like of the function expanding board or function expanding unit executes a part or all of the actual processes on the basis of instructions of the program codes.

The program codes themselves which are installed in the computer in order to realize the functions and processes of the invention by a computer also realize the invention. That is, according to claims of the invention, the computer program itself to realize the functions and processes of the invention are also incorporated.

As a supplying method of the computer program, it is not limited to the case where the computer program is stored in the FD or CD-ROM and read out by a computer and installed in the computer as mentioned above, the computer program can be also supplied by a method whereby the apparatus is connected to a homepage of the Internet by using the browser of the client computer and the computer program itself of the invention or a compressed file including the automatic installing function is downloaded from the homepage. The computer program can be also realized by a method whereby the program codes constructing the program of the invention are divided into a plurality of files and each file is downloaded from different homepages. That is, a WWW server for downloading a program file to realize the functions and processes of the invention by a computer into a plurality of users is also incorporated in claims of the invention.

The computer program can be also realized by a method whereby the program of the invention is encrypted and stored in a storage medium such as an FD or the like and distributed to the users, key information to decrypt the encryption is downloaded from the homepage through the Internet to the user who can satisfy predetermined conditions, and the encrypted program is executed by using the key information and installed into a computer.

As many apparently widely different embodiments of the present invention can be made without departing from the spirit and scope thereof, it is to be understood that the invention is not limited to the specific embodiments thereof except as defined in the appended claims.

As described in detail above, according to the invention, even if the search conditions are not individually set, a desired printer can be automatically selected from the print data. Even if the printer whose printing has been designated does not have an ability enough to obtain a desired print result, the operation such that the user designates the print conditions and searches the printer adapted to the print conditions as in the conventional manner is unnecessary. The printer serving as an output destination can be automatically selected and the data can be transmitted thereto. A labor and a troublesomeness of the printing work can be omitted.

What is claimed is:

1. An information processing apparatus which is connected to a plurality of printers through a network, which has a plurality of printer drivers and a virtual printer driver, which selects a specific printer from among the plurality of printers, and which transmits print data to the selected printer, comprising:

setting means for setting print conditions of a print job via a user interface of the virtual printer driver;

intermediate print data generating means for receiving a drawing function formed by a graphic engine of an operating system on the basis of a draw command from an application program, and generating intermediate print data on the basis of the drawing function, the intermediate print data having a format independent of a printer to which the intermediate print data is to be output;

print condition obtaining means for obtaining, in response to the generation of the intermediate print data by said intermediate print data generating means, the print conditions set by said setting means to print the print job of the intermediate print data generated by said intermediate print data generating means;

search condition transmitting means for transmitting the print conditions obtained by said print condition obtaining means as printer search conditions to a search server;

selecting means for selecting a printer to which the intermediate print data should be output on the basis of device designation information obtained from the search server in accordance with the printer search conditions; and intermediate print data output means for selecting a printer driver corresponding to the printer selected by said selecting means and outputting the intermediate print data to the graphic engine of the operating system so as to transfer the drawing function to the selected printer driver.

2. An apparatus according to claim 1, wherein said intermediate print data output means converts said intermediate print data into a draw command which can be interpreted by said graphic engine of the operating system and outputs said converted draw command to said graphic engine.

3. An apparatus according to claim 1, wherein said print condition obtaining means obtains said print conditions from said intermediate print data and a print setting of said print job.

4. An apparatus according to claim 1, wherein said print conditions include function information of devices connected to said network.

5. An apparatus according to claim 2, wherein said intermediate print data output means selects the printer driver to which the drawing function should be output when the draw command is output to said graphic engine.

6. An information processing method for an information processing apparatus which is connected to a plurality of printers through a network, which has a plurality of printer drivers and a virtual printer driver, which selects a specific printer from among the plurality of printers, and which transmits print data to the selected printer, comprising the steps of:

a setting step of setting print conditions of a print job via a user interface of the virtual printer driver;

an intermediate print data generating step of receiving a drawing function formed by a graphic engine of an operating system on the basis of a draw command from an application program and generating intermediate print data on the basis of the drawing function, the intermediate print data having a format independent of a printer to which the intermediate print data is to be output;

a print condition obtaining step of obtaining, in response to the generation of the intermediate print data by said intermediate print data generating step, the print conditions set by said setting step to print the print job of the intermediate print data generated by said intermediate print data generating step;

a search condition transmitting step of transmitting the print conditions obtained by said print condition obtaining step as printer search conditions to a search server;

a selecting step of selecting a printer to which the intermediate print data should be output on the basis of device designation information obtained from the search server in accordance with the printer search conditions; and an intermediate data output step of selecting a printer driver corresponding to the printer selected by said selecting step and outputting the intermediate print data to the graphic engine of the operating system so as to transfer the drawing function to the selected printer driver.

7. A method according to claim 6, wherein in said intermediate print data output step, said intermediate print data is converted into a draw command which can be interpreted by said graphic engine of the operating system and said converted draw command is output to said graphic engine.

8. A method according to claim 6, wherein in said print condition obtaining step, said print conditions are obtained from said intermediate print data and a print setting of said print job.

9. A method according to claim 6, wherein said print conditions include function information of devices connected to said network.

10. A method according to claim 7, wherein in said intermediate print data output step, the printer driver to which the drawing function should be output is selected when the draw command is output to said graphic engine.

11. A computer-readable storage medium which stores a program for an information processing method for an information processing apparatus which is connected to a plurality of printers through a network, which has a plurality of printer drivers and a virtual printer driver, which selects a specific printer from among the plurality of printers, and which transmits print data to the selected printer, wherein said program comprises the steps of:

a setting step of setting print conditions of a print job via a user interface of the virtual printer driver;

an intermediate print data generating step of receiving a drawing function formed by a graphic engine of an operating system on the basis of a draw command from an application program and generating intermediate print data on the basis of the drawing function, the intermediate print data having a format independent of a printer to which the intermediate print data is to be output;

a print condition obtaining step of obtaining, in response to the generation of the intermediate print data by said intermediate print data generating step, the print conditions set by said setting step to print the print job of the intermediate print data generated by said intermediate print data generating step;

a search condition transmitting step of transmitting the print conditions obtained by said print condition obtaining step as printer search conditions to a search server;

a selecting step of selecting a printer to which the intermediate print data should be output on the basis of device designation information obtained from the search server in accordance with the printer search conditions; and an intermediate print data output step of selecting a printer driver corresponding to the printer selected by said selecting step and outputting the intermediate print data to the graphic engine of the operating system so as to transfer the drawing function to the selected printer driver.

12. A medium according to claim 11, wherein in said intermediate print data output step, said intermediate print data is converted into a draw command which can be interpreted by said graphic engine of the operating system and said converted draw command is output to said graphic engine.

13. A medium according to claim 11, wherein in said print condition obtaining step, said print conditions are obtained from said intermediate print data and a print setting of said print job.

14. A medium according to claim 11, wherein said print conditions include function information of devices connected to said network.

15. A medium according to claim 12, wherein in said intermediate print data output step, the printer driver to which the drawing function should be output is selected when the draw command is output to said graphic engine.

16. An information processing program storing on a computer-readable storage medium for an information processing method for an information processing apparatus which is connected to a plurality of printers through a network, which has a plurality of printer drivers and a virtual printer driver, which selects a specific printer from among the plurality of printers, and which transmits print data to the selected printer, wherein said program comprises the steps of:

a setting step of setting print conditions of a print job via a user interface of the virtual printer driver;

an intermediate print data generating step of receiving a drawing function formed by a graphic engine of an operating system on the basis of a draw command from an application program and generating intermediate print data on the basis of the drawing function, the intermediate print data having a format independent of a printer to which the intermediate print data is to be output;

a print condition obtaining step of obtaining, in response to the generation of the intermediate print data by said intermediate print data generating step, the print conditions set by said setting step to print the print job of the intermediate print data generated by said intermediate print data generating step;

a search condition transmitting step of transmitting the print conditions obtained by said print condition obtaining step as printer search conditions to a search server;

a selecting step of selecting a printer to which the intermediate print data should be output on the basis of device designation information obtained from the search server in accordance with the printer search conditions; and an intermediate print data output step of selecting a printer driver corresponding to the printer selected by said selecting step and outputting the intermediate print data to the graphic engine of the operating system so as to transfer the drawing function to the selected printer driver.

17. A program according to claim 16, wherein in said intermediate print data output step, said intermediate print data is converted into a draw command which can be interpreted by said graphic engine of the operating system and said converted draw command is output to said graphic engine.

18. A program according to claim 16, wherein in said print condition obtaining step, said print conditions are obtained from said intermediate print data and a print setting of said print fob.

19. A program according to claim 16, wherein said print conditions include function information of devices connected to said network.

20. A program according to claim 17, wherein in said intermediate print data outlet step, the printer driver to which the drawing function should be output is selected when the draw command is output to said graphic engine.

* * * * *

UNITED STATES PATENT AND TRADEMARK OFFICE
CERTIFICATE OF CORRECTION

PATENT NO. : 6,965,958 B1
APPLICATION NO. : 09/692229
DATED : November 15, 2005
INVENTOR(S) : Hideki Sugiyama Page 1 of 1

It is certified that error appears in the above-identified patent and that said Letters Patent is hereby corrected as shown below:

COLUMN 3:
Line 26, "be also" should read -- also be --.

COLUMN 4:
Lines 51 and 60, "be also" should read -- also be --.

COLUMN 8:
Line 7, "comprises" should read -- comprise --.

COLUMN 10:
Line 64, "be also" should read -- also be --.

COLUMN 11:
Linea 5 and 25, "be also" should read -- also be --.

COLUMN 15:
Line 18, "storing" should read -- stored --.

Signed and Sealed this

Twenty-eighth Day of November, 2006

JON W. DUDAS
*Director of the United States Patent and Trademark Office*